United States Patent
Mohindra

(10) Patent No.: US 6,766,148 B1
(45) Date of Patent: Jul. 20, 2004

(54) SWITCHED SIDEBAND FREQUENCY LOW-IF TRANSMITTER

(75) Inventor: Rishi Mohindra, Milpitas, CA (US)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/532,819

(22) Filed: Mar. 21, 2000

(51) Int. Cl.[7] .......................... H04B 1/38; H04B 5/00; H04B 7/00; H04B 1/06; H04B 1/10

(52) U.S. Cl. .................. 455/73; 455/42; 455/234.1; 455/304; 455/324; 455/326; 375/146; 375/324; 375/346; 370/280; 329/336; 332/104; 341/145

(58) Field of Search ................... 455/73, 324, 42, 455/326, 304, 234.1; 329/336; 375/346, 146, 324; 332/104; 341/145; 370/280

(56) References Cited

U.S. PATENT DOCUMENTS

| | | | | |
|---|---|---|---|---|
| 5,438,692 A | * | 8/1995 | Mohindra | 455/324 |
| 5,584,068 A | * | 12/1996 | Mohindra | 455/324 |
| 5,826,174 A | * | 10/1998 | Vu | 455/42 |
| 6,137,353 A | * | 10/2000 | Stroet et al. | 329/336 |
| 6,148,047 A | * | 11/2000 | Mohindra | 375/346 |
| 6,169,463 B1 | * | 1/2001 | Mohindra et al. | 332/104 |
| 6,272,329 B1 | * | 8/2001 | Sawchuk | 455/326 |
| 6,314,279 B1 | * | 11/2001 | Mohindra | 455/304 |
| 6,317,067 B1 | * | 11/2001 | Mohindra | 341/145 |
| 6,366,604 B1 | * | 4/2002 | Mohindra | 375/146 |
| 6,442,380 B1 | * | 8/2002 | Mohindra | 455/234.1 |
| 6,477,148 B1 | * | 11/2002 | Gardenfors et al. | 370/280 |
| 2003/0031273 A1 | * | 2/2003 | Mohindra | 375/324 |
| 2003/0053563 A1 | * | 3/2003 | Mohindra | 375/324 |

FOREIGN PATENT DOCUMENTS

| | | | |
|---|---|---|---|
| EP | 0599409 | * | 11/1993 |
| EP | 0575000 | * | 12/1993 |
| EP | 0599414 | * | 6/1994 |
| JP | 02000349678 A | * | 12/2000 |
| JP | 02000349837 A | * | 12/2000 |
| WO | WO97/01218 | * | 1/1997 |
| WO | WO01/71929 A2 | * | 9/2001 |

OTHER PUBLICATIONS

Stroet, et al, "A Zero–IF Single Chip Transceiver for up to 22 M QPSK 802.11b Wireless LAN", Solid State Circuits Conference, 2001, Feb. 5, 2001, pp. 204, 205, 447.*

* cited by examiner

Primary Examiner—William Cumming
(74) Attorney, Agent, or Firm—Kevin Simons

(57) ABSTRACT

A transmitter for transmitting a high frequency transmit signal generates a low intermediate frequency quadrature signal, and up-converts the low intermediate frequency quadrature signal to the high frequency transmit signal. The frequency spectrum of the high frequency transmit signal has a transmit band and a sideband corresponding to the transmit band. The transmit band is confined to a total transmit band outside of which severe sideband filtering requirements.apply. Before up-converting, the transmitter provides that the sideband falls at a side of the transmit band such that the sideband falls within the total transmit band.

12 Claims, 3 Drawing Sheets

| $f_{RF}$ | $f_{LO}$ | XMIT | SB |
|------|------|-------|-------|
| 2412 | 2423 | LOWER | UPPER |
| 2417 | 2428 | LOWER | UPPER |
| --- | ↕ | ⋮ | ⋮ |
| 2457 | 2446 | UPPER | LOWER |
| 2462 | 2451 | UPPER | LOWER |

$f_{IF} = 11\ MHz$

SWITCHED SIDEBAND FREQUENCY LOW-IF TRANSMITTER

BACKGROUND OF THE INVENTION

1. Field of the Invention

The present invention relates to a transmitter, more particularly to suppression of sidebands in allow intermediate frequency transmitter. Such a transmitter can be a transmit branch of a time division duplex transceiver that has a common local oscillator for the transmit branch and the receive branch of the transceiver, e.g, a transceiver operating in the so-called 2.4 GHz ISM band, or any other suitable transmitter or transceiver.

2. Description of the Related Art

In time division duplexing transceivers, in order to reduce cost, it is desirable to have a common local oscillator for the transmitter and the receiver. Furthermore, in order to achieve a short transmit-receive turn-around time, the same synthesizer based local oscillator frequency should be used for the transmitter and the receiver. Moreover, in order to be able to integrate receive channel filters, or to produce transmitter base band I and Q signals via digital-to-analog converters while applying a low sampling rate, the intermediate frequency should be kept low with respect to the radio frequency. Particularly when such a common-LO and low-IF transceiver operates at a microwave frequency range, e.g. at a 2.4 GHz ISM (Industrial Scientific and Medical) band, the transmitter exhibits carrier leakage, and, in addition to a desired transmit band within the ISM band, its sideband is-transmitted. In order mitigate DC offset related problems in the receiver, a low IF architecture is preferable. However, to keep the synthesizer frequency the same, the transmitter operates with the same low IF frequency. This produces an unwanted sideband in the transmitter, at a frequency distance of twice the intermediate frequency from the central frequency of the desired transmit band. For low-IF, it is difficult to filter-out the unwanted sideband, particularly if it falls outside the ISM band.

SUMMARY OF THE INVENTION

It is an object of the invention to provide a transmitter wherein filtering requirements of filtering a sideband of a desired transmit band in a given band are highly obviated.

It is another object of the invention to ensure that the sideband does not fall outside the given band.

In accordance with the invention, a method for transmitting a high frequency transmit signal is provided, said method comprising:

generating a low intermediate frequency quadrature signal;

up-converting said low intermediate frequency; quadrature signal to said high frequency transmit signal, a frequency spectrum of said high frequency transmit signal having a transmit band and a sideband corresponding to said transmit band, said transmit band being confined to a total transmit band outside of which severe sideband filtering requirements apply;

before said up-converting, providing that said side band falls at a side of said transmit band such that said sideband falls within said total-transmit band; and transmitting said high frequency transmit signal.

Because the sideband now always falls within the total transmit band, filtering requirements thereof are greatly obviated. In the ISM-band, for instance, sideband suppression should typically be better than −47 dBm. Inside the total transmit band, typically, the sideband should only be 20 dB below the transmit band.

In a first embodiment, transmit band and sideband exchange is done at up-converting, by exchanging quadrature local oscillator signals.

In a second embodiment, transmit band and sideband exchange is done at a low intermediate frequency, by exchanging low intermediate frequency quadrature signals.

In both embodiments, upon exchanging a transmit band and its sideband, the frequency of the local oscillator signal is frequency shifted over twice the low intermediate frequency.

In the first embodiment, preferably, exchange of quadrature local oscillator signals is done by controlling a phase of a buffer, controlling the phase between a first phase and a second phase that differ 180°.

BRIEF DESCRIPTION OF THE DRAWING

FIG. 6 shows a look-up table with look-up data to exchange a transmit band and its sideband, according to the invention.

Throughout the figures the same reference numerals are used for the same features.

DESCRIPTION OF THE DETAILED EMBODIMENTS

Figure 1:
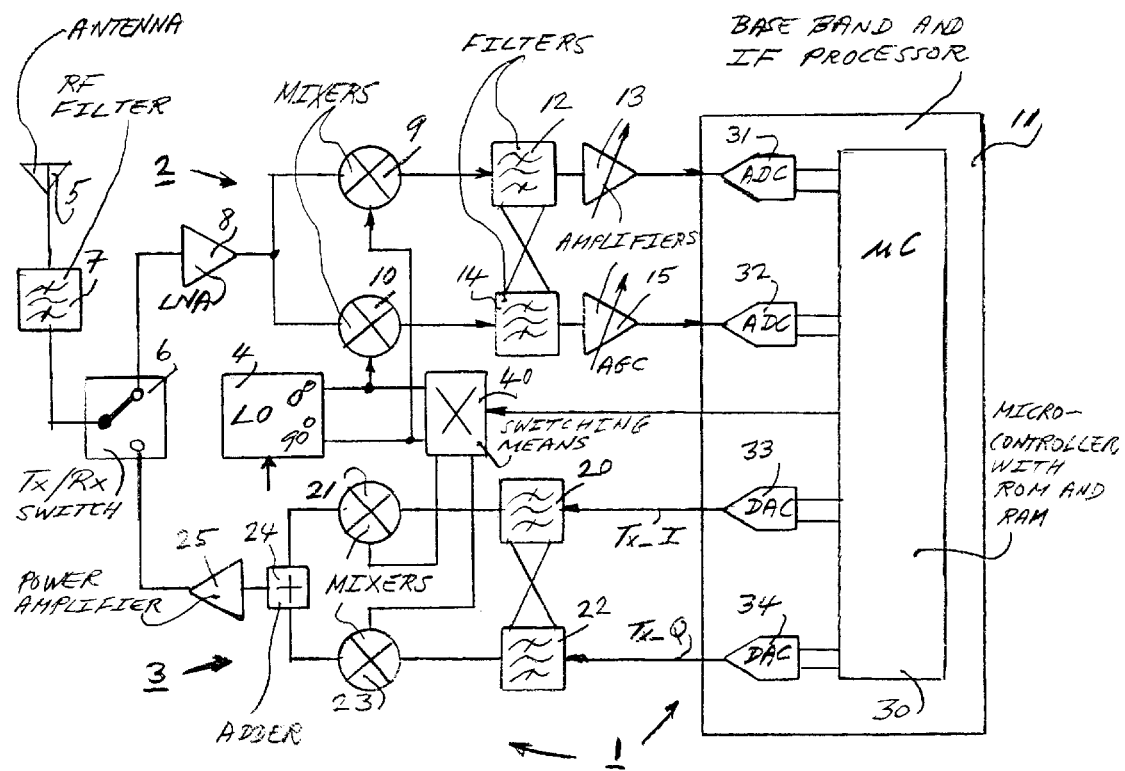
FIG. 1 is a block diagram of a transceiver according to the invention, with a transmitter and a receiver.

FIG. 1 is a block diagram of a transceiver 1 according to the present invention The transceiver 1 comprises a receiver 2, a transmitter 3, and a local oscillator 4 that produces quadrature local oscillator signals that are 90° phase shifted with respect- to each other. For operating the transceiver 1 in the so-called 2.4 GHz ISM band, the local oscillator 4 is tuned to the same transmit and:receive frequency, and, preferably, is commonly used by the receiver 2 and the transmitter 3. As is well-known in the art, such a local oscillator usually comprises a phase locked loop (PLL) and voltage controlled oscillator (VCO), an output of the VCO being coupled to phase shifters that have relative phase shift of 90° with respect to each other, schematically indicated with 0° and 90°. The local oscillator is not shown in detail, here. The receiver 2 and the transmitter 3 are coupled to an antenna 5 via a transmit/receive switch 6 and an RF-filter 7. The receiver 2 comprises a low-noise amplifier (LNA) 8 that is coupled to a mixer 9 in an in-phase branch and to a mixer 10 in a quadrature branch. The mixer 9 is coupled to baseband, and intermediate frequency band processor 11 via a cross-coupled polyphase filter with a low-IF band filter 12, and a gain controlled amplifier 13 for AGC (Automatic Gain Control). The mixer 10 is coupled to the baseband and intermediate frequency band processor 11 via a low-IF band filter 14 in the cross-coupled polyphase filter, and a gain controlled amplifier 15. The transmitter 3 comprises an in-phase and a quadrature branch. The in-phase branch comprises a band-pass filter 20 and a mixer 21. The quadrature branch comprises a band-pass filter 22 and a mixer 23. Outputs of the respective mixers 21 and 23 are supplied to an adder 24 that is coupled to the Tx/Rx-switch via a a power amplifier 25. The baseband and intermediate frequency band processor 11 comprises a programmed microcontroller (μC) 30 with ROM and RAM (the ROM and RAM are not shown in detail here). The ROM, e.g. an EEPROM, or any other suitable ROM, is programmed to control the operation of the transceiver 1. The baseband and intermediate frequency band processor 11 further comprises analog-to-digital converters (ADC) 31 and 32 for sampling output signals at the amplifiers 13 and 15 digital-to-analog converters (DAC) 33 and 34 for providing quadrature low intermediate transmit signals Tx_I and Tx_Q, respectively. In accordance with the invention, a sideband of a transmit-band is either transmitted as an upper band or as a lower band, depending on the actual transmit frequency in the ISM band, so as to greatly mitigate filtering requirements otherwise imposed upon filtering of a sideband when it falls or would fall outside the ISM band. Upon interchanging the transmit band and its sideband, the transmit band remains the same. In the embodiment shown, switching of the sideband, so that it is transmitted either as a lower or an upper band, is done by interchanging the 90° phase shifted local oscillator signal by controlling switching means 40. In an alternative embodiment, interchanging the transmit band and its sideband, while still transmitting the same transmit band, is done by interchanging the quadrature low intermediate transmit signals Tx_I and Tx_Q. Upon interchanging the transmit band and its sideband, the frequency of the local oscillator 4 is changed accordingly, over a frequency distance of twice the intermediate frequency of the transmit signals Tx_I and Tx_Q.

Figure 2:
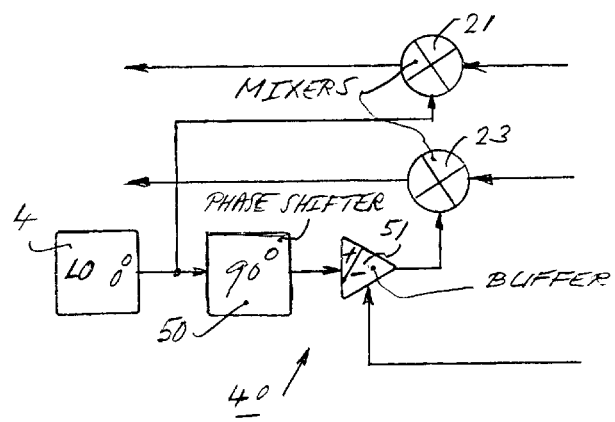
FIG. 2 is an embodiment of a switching means of the transceiver according to the invention.

FIG. 2 is an embodiment of the switching means 40 of the transceiver 1 according to the invention. The switching means 40 comprises a 90° phase shifter 50 that is coupled between the local oscillator 4 and a controllable buffer 51 controlled by the microcontroller 30. Depending on the control signal provided by the microcontroller 30, the buffer operates as an non-inverting or as an inverting buffer or amplifier. The local oscillator signal provided to the in-phase and quadrature branches of the transmitter 3 are thus 180° shifted. By at the same time frequency shifting the local oscillator frequency over twice the intermediate frequency, the sideband of the transmit band is shifted from right to left, or from left to right, of the transmit band.

Figure 3:
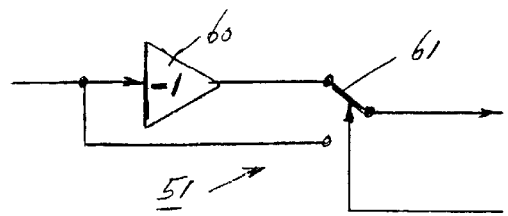
FIG. 3 is a more detailed embodiment of a controllable buffer of the transceiver according to the invention.

FIG. 3 is a more detailed embodiment of the controllable buffer 51 of the transceiver 1 according to the invention. The controllable buffer 51 comprises an inverting amplifier 60 and a controllable switch coupled between an output of the amplifier 60 and an input of the inverting amplifier 60.

Figure 4:
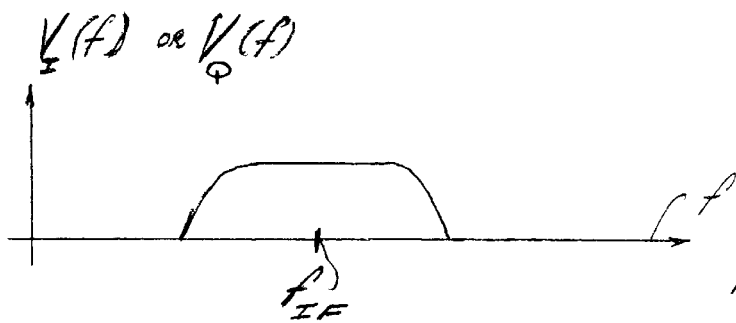
FIG. 4 shows a frequency spectrum of transmit signals generated by a transceiver according to the invention.

FIG. 4 shows a frequency spectrum of the transmit signals Tx_I and Tx_Q generated by the transceiver 1 according to the invention. Shown are frequency spectra $V_I(f)$ or $V_Q(f)$, the Fourier Transforms of the transmit signals Tx_I and Tx_Q, respectively, at an intermediate frequency $f_{IF}$. The low IF signals Tx_I and Tx_Q can either be generated digitally, by the microcontroller 30, or, alternatively, by a pair of analog mixers and a further local oscillator at $f_{IF}$.

Figure 5:
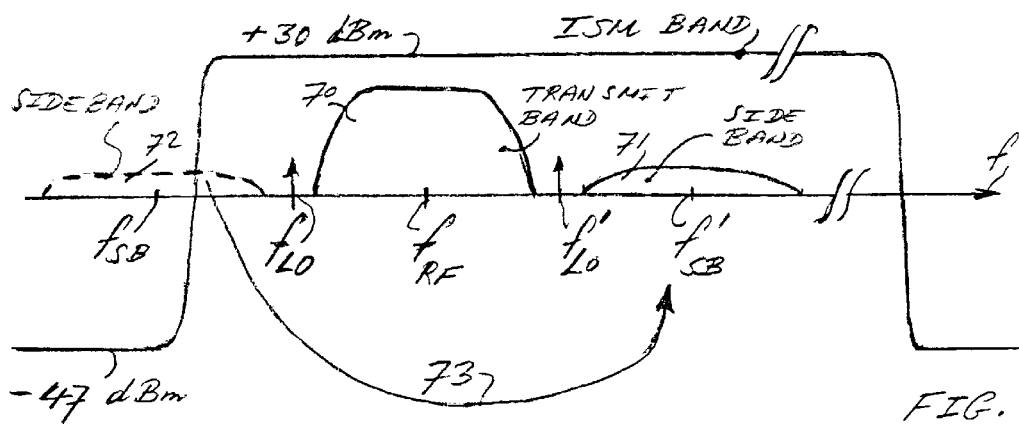
FIG. 5 illustrates exchange of a transmit band and its sideband, according to the invention.

FIG. 5 illustrates exchange of a transmit band and its sideband according to the invention. Shown is a 2.4 GHz ISM band, between 2400 and 2480 MHz. As shown, power at the antenna 5 should be below +30 dBm within the ISM band, a suppression outside the ISM band should be over −47 dBm. So, when the sideband would fall outside the ISM band, an extremely good sideband suppression would be needed, or the I- and Q-gain and phase should be extremely well balanced to suppress the sideband. Such an extreme suppression or balancing is difficult to realize, if at all, in practice. With interrupted lines it is indicated that the ISM band extends over a number of channels. Shown is a transmit band 70 with its sideband as an upper band 71 or as a lower band 72. When the default is transmitting a sideband as a lower band, and the transmit band as an upper band, according to the invention the sideband is shifted to the right of the transmit band, i.e., the transmit band becomes lower band, and the sideband becomes upper band, when the default sideband falls outside the ISM band. In the shown spectrum, the default side band partly falls outside the ISM band and thus should be shifted to the other side of the transmit band 70, as indicated with an arrow 73, and shifted or applied local oscillator and sideband frequencies $f_{LO}'$ and $f_{SB}'$ as compared to default local oscillator and sideband frequencies $f_{LO}$ and $f_{SB}$. For transmit bands at the upper part of the ISM band, the corresponding sidebands should remain at the left of the transmit band. With the invention, it is thus ensured that the sideband never falls outside the ISM band. The simplest way of achieving this is by keeping a sideband to the right of its transmit band when the transmit band is in the lower half of the ISM band, and, by keeping a sideband to the left of its transmit band when the transmit band is in the upper half of the ISM band. But,depending on the actual band and channels within such a band, it is sufficient to deviate from the default transmit mode of transmitting a transmit band and its sideband, only if the sideband would fall outside the actual band. Such a situation could occur relatively close to the edges of the actual band only, depending on the number of channels within a band, and the channel width. It is thus essential to keep the sideband inside the actual band. With keeping the sideband within the ISM band, the sideband needs only to be some 20 dB below the transmit band, for instance, so that filtering demands are highly obviated.

FIG. 6 shows a look-up table with look-up data, to exchange a transmit band XMIT and its sideband SB according to the invention. Depending on the transmit frequency $f_{RF}$, the frequency $f_{LO}$ of the local oscillator 4 is set and interchanging of side band and transmit band is done. In the embodiment shown, the default transmission mode is transmitting the transmit band XMIT as the lower band and its sideband SB as the upper band. This default mode is applied when the transmit band is in the lower half of the ISM band, and no exchange is needed. Exchange is done by the micocontroller 30, and the local oscillator frequency is set accordingly, when the transmit band is in the upper half of the ISM band. Such an exchange is indicated in the look-up table by "LOWER" and "UPPER". Further shown are $f_{RF}$ of 2412, 2417, 2457, and 2462 MHz, corresponding $f_{LO}$ frequencies of 2423, 2428, 2446, and 2451 MHz, and an intermediate frequency of 11 MHz. The shown dots indicate other frequencies in between the shown frequencies, at a frequency distance of 5 MHz.

Together with the sideband, also the carrier leakage signal is moved. Moving the carrier leakage signal itself, even with a very good sideband suppression, will also move the sideband.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claim is:

1. A method of transmitting a high frequency transmit signal comprising:

generating a low intermediate frequency quadrature signal;

up-converting said low intermediate frequency quadrature signal to said high frequency transmit signal, a frequency spectrum of said high frequency transmit signal having a transmit band and a sideband corresponding to said transmit band, said transmit band being confined to a total transmit band outside of which severe sideband filtering requirements apply;

before said up-converting, providing that said sideband falls at a side of said transmit band such that said sideband falls within said total transmit band; and transmitting said high frequency transmit signal.

2. A method as claimed in claim 1, wherein in a default transmission mode, said side band is at a first side of said transmit band, said method further comprising modifying said default transmit mode, when said first side would at least partly fall outside said total transmit band, such that a modified sideband is at a second side of said transmit band, said modified sideband being within said total transmit band.

3. A method as claimed in claim 2, further comprising, when said sideband at said first side would at least partly fall outside said total transmit,band, shifting a frequency of a local oscillator signal over a frequency distance of twice a low intermediate frequency of said low intermediate frequency quadrature signal, said local oscillator signal being used for said up-converting.

4. A method as claimed in claim 3, further comprising exchanging said transmit band and said sideband by exchanging quadrature signals of said local oscillator signal said quadrature, signals being used for said up-converting.

5. A method as claimed in claim 3, further comprising exchanging said transmit band and said sideband by exchanging in-phase and quadrature signals of said low intermediate frequency quadrature signal.

6. A transmitter comprising:

means for generating a low intermediate frequency quadrature signal;

means for up-converting said low intermediate frequency quadrature signal to said high frequency transmit signal, a frequency spectrum of said high frequency transmit signal having a transmit band and a sideband corresponding to said transmit band, said transmit band being confined to a total transmit band outside of which severe sideband filtering requirements apply;

means for providing, before said up-converting, that said sideband falls at a side of said transmit band such that said sideband falls within said total transmit band; and means for transmitting said high frequency transmit signal.

7. A transmitter claim 6, wherein in a default transmission mode, said side band is at a first side of said transmit band, said transmitter comprising means for modifying said default transmit mode, when said first side would at least partly fall outside said total transmit band, such that a modified sideband is at a second side of said transmit band, said modified sideband being within said total transmit band.

8. A transmitter as claimed in claim 7, comprising means for shifting a frequency of a local oscillator signal over a frequency distance of twice a low intermediate frequency of said low intermediated frequency quadrature signal, said local oscillator signal being used for said up-converting, and said shifting being performed when said sideband at said first side would at least partly fall outside said total transmit band.

9. A transmitter as claimed in claim 8, comprising means for exchanging said transmit band and said sideband by exchanging quadrature signals of said local oscillator signal, said quadrature signals being used for said up-converting.

10. A transmitter as claimed in claim 9, wherein said means for exchanging comprise a controllable buffer amplifier with a controllable phase of 0° and 180°.

11. A transmitter as claimed in claim 8, comprising means for exchanging said transmit band and said sideband by exchanging in-phase and quadrature signals of said low intermediate frequency quadrature signal.

12. A transceiver having a receiver and a transmitter, said transmitter comprising:

means for generating a low intermediate frequency quadrature signal;

means for up-converting said low intermediate frequency quadrature signal to said high frequency transmit signal, a frequency spectrum of said high frequency transmit signal having a transmit band and aside band corresponding to said transmit band, said transmit band being confined to a total transmit band outside of which severe sideband filtering requirements apply;

means for providing, before said up-converting, that said sideband falls at a side of said transmit band such that said sideband falls within said total transmit band; and means transmitting said high frequency transmit signal.

* * * * *